(12) United States Patent
Koh

(10) Patent No.: US 9,013,581 B2
(45) Date of Patent: Apr. 21, 2015

(54) ASSOCIATING A WORK WITH A BIOMETRIC INDICATION OF THE IDENTITY OF AN AUTHOR

(75) Inventor: Haejung Lisa Koh, Toronto (CA)

(73) Assignee: BlackBerry Limited, Waterloo (CA)

( * ) Notice: Subject to any disclaimer, the term of this patent is extended or adjusted under 35 U.S.C. 154(b) by 42 days.

(21) Appl. No.: 13/249,700

(22) Filed: Sep. 30, 2011

(65) Prior Publication Data

US 2013/0083208 A1 Apr. 4, 2013

(51) Int. Cl.
*H04N 5/225* (2006.01)
*H04N 5/76* (2006.01)
*G06K 9/00* (2006.01)
*H04N 5/232* (2006.01)
*H04N 5/77* (2006.01)
*H04N 9/82* (2006.01)

(52) U.S. Cl.
CPC ............... *H04N 5/232* (2013.01); *H04N 5/772* (2013.01); *H04N 9/8205* (2013.01)

(58) Field of Classification Search
CPC ..... H04N 5/232; H04N 5/772; H04N 9/8205; H04N 1/2112; H04N 1/32128; H04N 1/4406; H04N 1/442; H04N 1/444; H04N 2201/0084; H04N 2201/3205; H04N 2201/3226; H04N 2201/3233
USPC ............ 348/77, 78, 161, 222.1; 383/115, 116
See application file for complete search history.

(56) References Cited

U.S. PATENT DOCUMENTS

| | | | | |
|---|---|---|---|---|
| 5,898,779 | A * | 4/1999 | Squilla et al. | 713/176 |
| 2005/0036656 | A1 * | 2/2005 | Takahashi | 382/100 |
| 2008/0025574 | A1 | 1/2008 | Morikawa et al. | |
| 2010/0226526 | A1 * | 9/2010 | Modro et al. | 382/100 |
| 2010/0316264 | A1 * | 12/2010 | Ferren et al. | 382/117 |
| 2011/0153362 | A1 * | 6/2011 | Valin et al. | 705/3 |
| 2012/0121140 | A1 * | 5/2012 | Gerken, III | 382/115 |

OTHER PUBLICATIONS

Chi-Man Pun and Ioi-Tun Lam; "Fingerprint Watermark Embedding by Discrete Cosine Transform for Copyright Ownership Authentication"; International Journal of Communications; Issue 1, vol. 3, 2009; pp. 17-24.
Metadata Working Group; "Guidelines for Handling Image Metadata"; Version 1.0.1; Feb. 2009; 46 pages.
Canon's Iris Registration Mode—Biological Copyright Metadata; www.photographybay.com/2008/02/09/canon-iris-registration-watermark/; 7 pages.

* cited by examiner

*Primary Examiner* — Twyler Haskins
*Assistant Examiner* — Padma Haliyur
(74) *Attorney, Agent, or Firm* — Ridout & Maybee LLP

(57) ABSTRACT

Storing biometric information regarding the identity of an author in association with an artistic work created by the author may assist in properly attributing ownership of rights to the artistic work. To facilitate the association, an apparatus used to create the work may be configured to include a component for capturing the biometric information regarding the identity of the author.

25 Claims, 11 Drawing Sheets

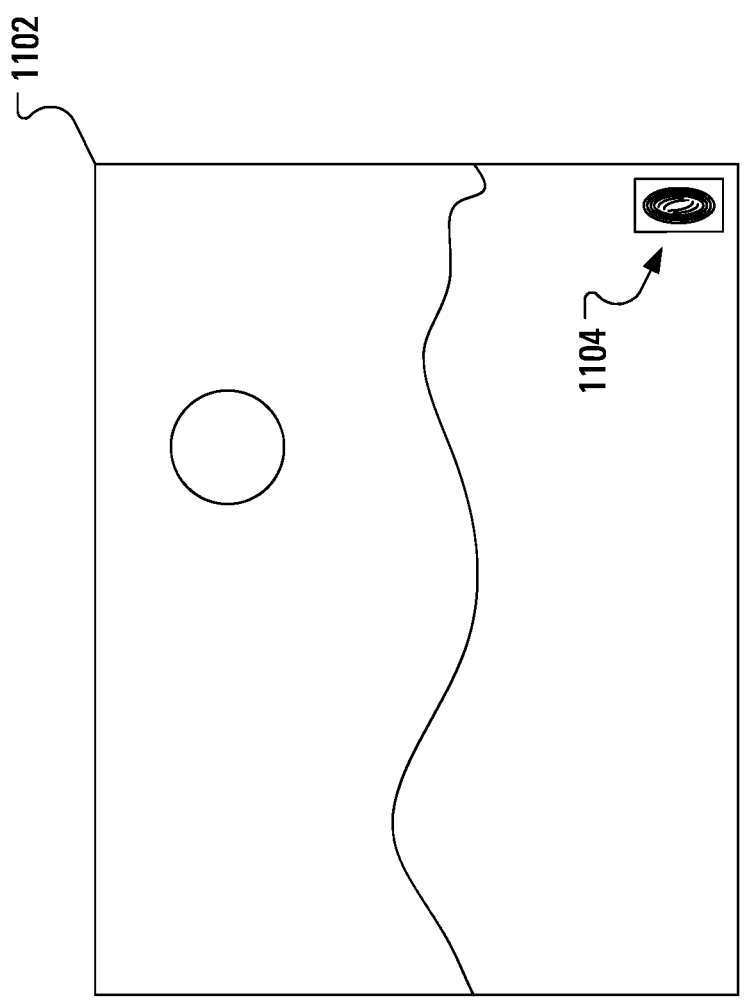

ASSOCIATING A WORK WITH A BIOMETRIC INDICATION OF THE IDENTITY OF AN AUTHOR

FIELD

The present application relates generally to creation of artistic works and, more specifically, to the associating of a work with a biometric indication of the identity of an author responsible for the creation of the work.

BACKGROUND

As an increasing volume of sensitive personal information is stored on computers, personal and otherwise, it is increasingly important that access to these computers is controlled. Even the most basic user of computers is familiar with a requirement to provide a password to gain access to a computer and execute various software application on the processor of the computer. Such a one-factor authentication scheme is based solely on what the user knows, i.e., the password. Should the password become known to those other than the user whose account access to which is controlled by the password, the others can use the password to gain access to the user's account.

To increase security, some computers have been configured to implement an additional authentication scheme. The additional factor is biometric information. Biometric information includes fingerprints, retinal scans, face geometry scans, hand geometry scans, voice or speech prints, etc. Now, to gain access to the computer of interest, the user provides a device password. If the password is determined to be valid, the user is prompted to provide biometric information. The user will only gain access to the computer of interest if the biometric information submitted responsive to the prompt properly matches a previously established and stored version of the biometric information.

The additional security provided to computers through the use of a biometric authentication scheme has recently been extended to other electronics.

BRIEF DESCRIPTION OF THE DRAWINGS

Reference will now be made to the drawings, which show by way of example, embodiments of the present disclosure, and in which:

FIG. 11 illustrates a result of an optional name data storage method.

DETAILED DESCRIPTION OF THE EMBODIMENTS

Storing biometric information regarding the identity of an author in association with an artistic work created by the author may assist in properly attributing ownership of rights to the artistic work. To facilitate the association, an apparatus used to create the work may be configured to include a component for capturing the biometric information regarding the identity of the author.

According to one aspect described herein, there is provided a method of storing an artistic work at an apparatus configured to capture the artistic work of authorship. The method comprises receiving a biometric indication of an identity of an author, responsive to the receiving the biometric indication, arranging capture of the artistic work, storing the artistic work at the apparatus and storing, associated with the artistic work, the biometric indication of the identity of the author. In other aspects of the present application, an apparatus is provided for carrying out this method and a computer readable storage medium is provided for adapting a processor to carry out this method.

Other aspects and features of the present invention will become apparent to those of ordinary skill in the art upon review of the following description of specific embodiments of the invention in conjunction with the accompanying figures.

Figure 1:
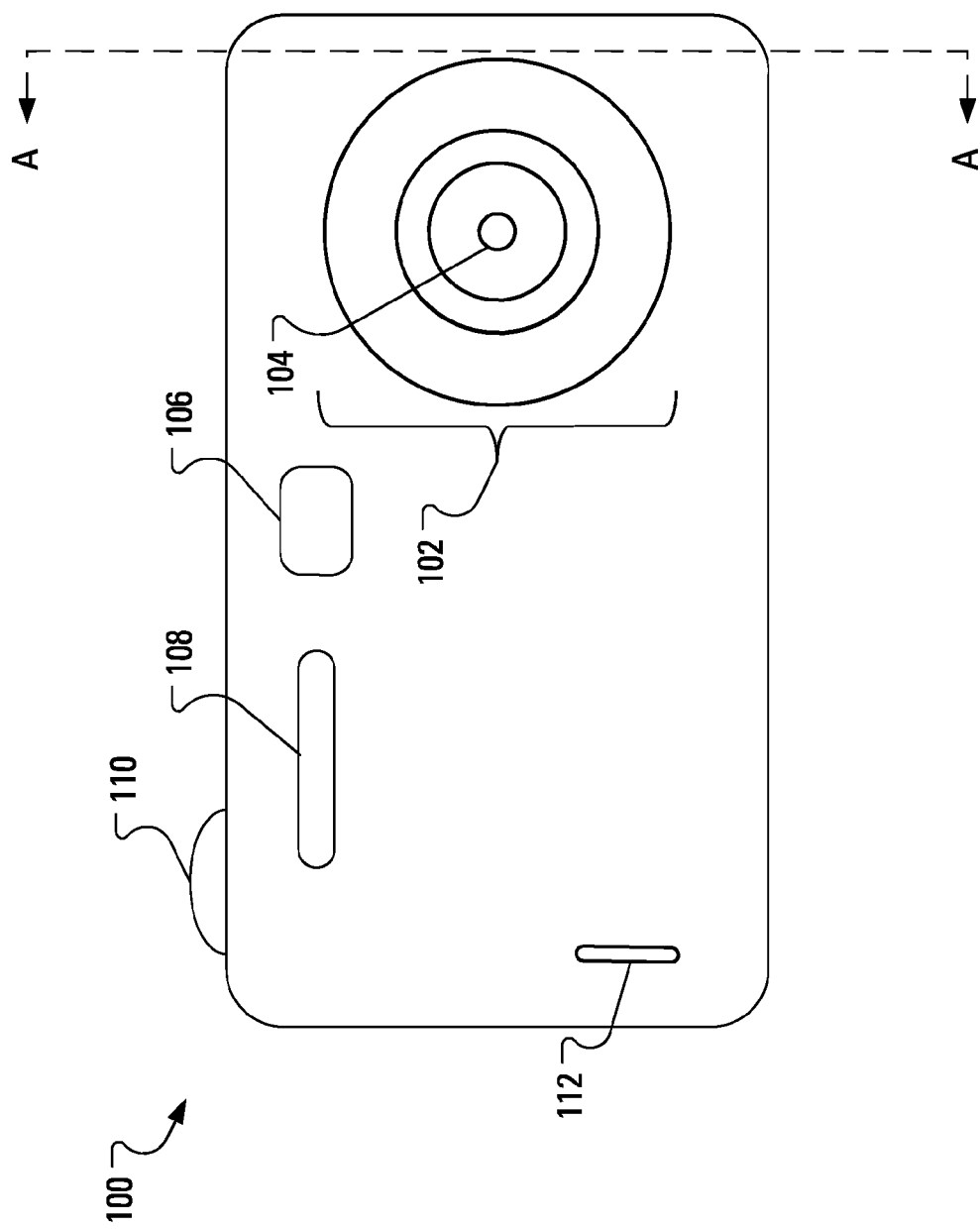
FIG. 1 illustrates a digital camera.

FIG. 1 illustrates a digital camera 100. The digital camera 100 includes components such as a lens assembly 102, a lens 104, a viewfinder aperture 106, a flash 108 and a shutter button 110. One component of the digital camera 100 that is atypical of such devices is a fingerprint sensor 112.

A fingerprint sensor generally comprises an electronic device used to capture a digital image of a fingerprint pattern. The captured digital image is called a live scan. As part of configuring a fingerprint access system, a live scan may be digitally processed to create a biometric template, which is stored and used for later matching. A future live scan may be similarly digitally processed to create a biometric in a format that facilitates matching with the previously captured and stored biometric template. Some of the more commonly used fingerprint sensor technologies include: optical; ultrasonic; and capacitance.

One example fingerprint sensor has a bar shape. A silicon sensor constructs a fingerprint as a user swipes a finger across the bar. Another example fingerprint sensor has a pad shape. A sensor constructs a fingerprint as a user holds a finger on the pad, which is designed with a size to accommodate an entire fingerprint.

Figure 2:
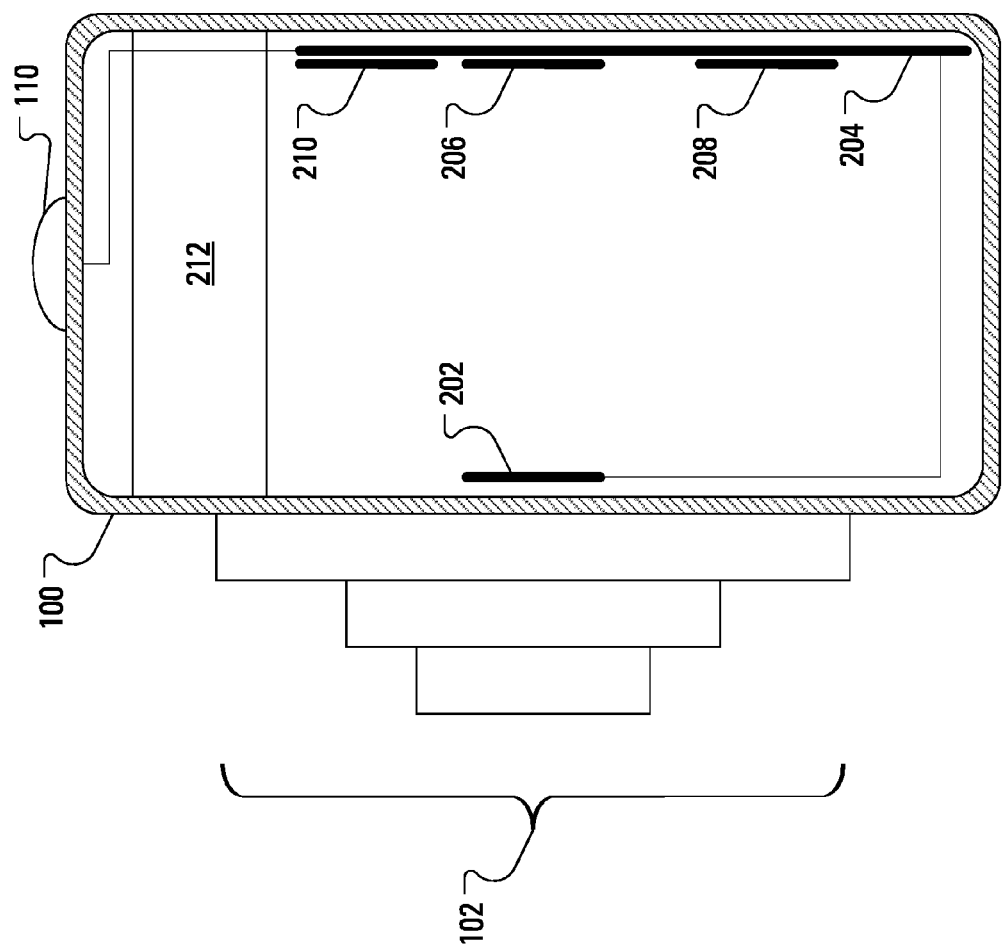
FIG. 2 illustrates the digital camera FIG. 1 in section along sectional line A:A.

FIG. 2 illustrates the digital camera 100 of FIG. 1 in section along sectional line A:A. The interior of the digital camera 100 includes a shutter 202 positioned corresponding to the center line of the lens assembly 102. Additionally, the interior of the digital camera 100 includes a circuit board 204, on which is mounted an image sensor 206, a processor 208 and a memory 210. Also illustrated as a feature of the interior of the digital camera 100 is a conduit 212 allowing a photographer to see through the viewfinder aperture 106 (see FIG. 1) at the front of the digital camera 100 from the back of the digital camera 100. The shutter button 110 and the shutter 202 are illustrated as connected to the circuit board 204, thereby connecting these components to the processor 208.

Example devices suitable for use as the image sensor 206 include an active-pixel sensor (APS), also known as a CMOS sensor and a charge-coupled device (CCD) image sensor.

In typical operation of a digital camera, the photographer presses a shutter button to initiate capture of a digital photograph. Responsive to receiving a shutter actuation instruction, generated by the shutter button responsive to having been pressed, a processor controls a shutter to open for the duration of an exposure time and then shut. During the exposure time, when the shutter is open, light is allowed to pass through a lens and onto an image sensor. The processor may then control the image sensor to pass its output (a digital photograph) to a memory.

In operation of the digital camera 100 of FIGS. 1 and 2, instead of pressing the shutter button 110, the photographer may swipe a finger across the fingerprint sensor 112 to initiate capture of a photograph. Responsive to receiving a shutter actuation instruction, generated by the fingerprint sensor 112 responsive to having received a fingerprint, the processor 208 controls the shutter 202 to open for the duration of an exposure time and then shut. During the exposure time, when the shutter 202 is open, light is allowed to pass through the lens 104 and onto the image sensor 206. The processor 208 may then control the image sensor 206 to pass its output (a digital photograph) to the memory 210.

A variety of positions are contemplated for the fingerprint sensor 112. For example, rather than placing the fingerprint sensor 112 on the front face of the digital camera 100, as illustrated in FIG. 1, the fingerprint sensor 112 may be integrated into the shutter button 110. Alternatively, the shutter button 110 may be replaced by the fingerprint sensor 112. Notably, the digital camera 100 may have a touchscreen display (not shown), for instance, positioned on the back side of the digital camera 100. The fingerprint sensor 112 may be integrated into the touchscreen display in a specific region of the touchscreen display. The processor 208 may control the touchscreen display to present a virtual button, a press on which is to initiate capture of a photograph. Where the virtual button is presented in the same region of the touchscreen display as the fingerprint sensor 112, the fingerprint sensor 112 may capture a fingerprint simultaneously with the touchscreen display sensing the photographer's touch on the touchscreen, thereby initiating capture of a photograph.

The digital photograph may, for example, be stored to the memory 210 in any one of a variety of common file formats such as Tagged Image File Format (TIFF), Joint Photographic Experts Group format (JPEG) and Photoshop Document format (PSD) as well as proprietary formats, such as the Raw image format.

The processor 208 may also store, to the memory 210 in association with the digital photograph, metadata related to the digital photograph. Metadata, often referred to as "data about data," provides information that supplements the primary content of digital documents. Metadata has become a useful tool to organize and search through growing libraries of image, audio and video content that users are producing and consuming. Metadata properties may be used to describe what the digital photograph represents and where, when and how the image was taken.

Within image file formats, metadata can be stored within a variety of common metadata container formats. One such metadata container format is Exchangeable Image File format (Exif). When Exif is employed for digital photographs in the JPEG format, the Exif data is stored in a utility Application Segment called "APP1", which in effect holds an entire TIFF file within. When Exif is employed for digital photographs in the TIFF, the TIFF Private Tag defines a sub-Image File Directory (IFD) that holds Exif-specified TIFF Tags.

Other metadata container formats include Adobe Extensible Metadata Platform (XMP), Photoshop Image Resources (PSIR) and International Press Telecommunications Council Information Interchange Model (IPTC-IIM). Each metadata container format has unique rules regarding how metadata properties are to be stored, ordered and encoded within the container.

Within metadata container formats, metadata can be stored within a variety of semantic groupings. Some useful properties, such as a copyright string, can be stored within many containers with similar, but subtly distinct, semantics.

Figure 3:
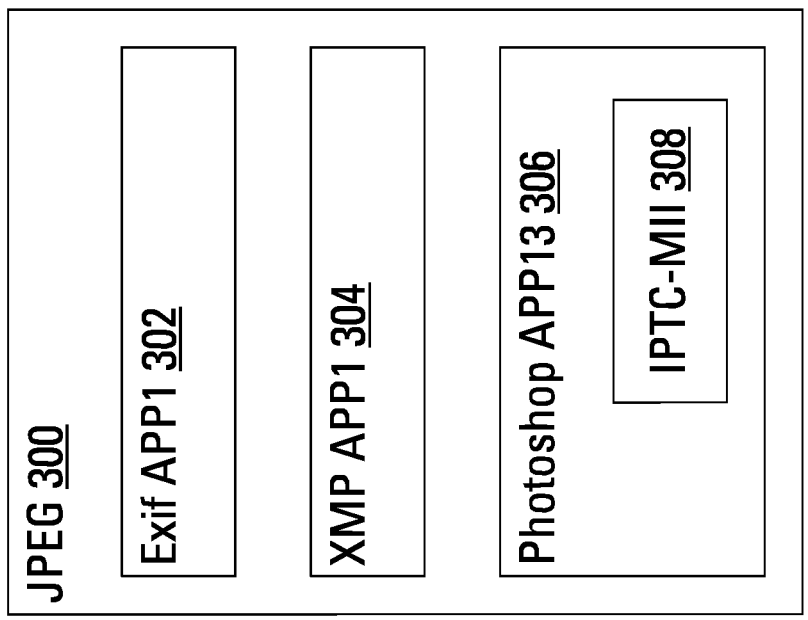
FIG. 3 illustrates a representation of a digital photograph in JPEG format.

FIG. 3 illustrates a representation of a digital photograph 300 in JPEG format. The digital photograph 300 includes metadata stored in: an Exif APP1 metadata container 302; an XMP APP1 metadata container 304; and a Photoshop APP13 metadata container 306. The Photoshop APP13 metadata container 306 includes an IPTC-MII semantic grouping 308.

Digital photography is no longer the exclusive domain of dedicated digital photography apparatus. Cellular phones, smart phones, personal digital assistants, tablet computers, desktop computers, notebook computers and other mobile electronic devices are increasingly equipped with hardware that allows the capture of digital photographs and/or digital video. Such devices are capable of allowing the creation, and editing, of text documents, or documents that comprise computer program source code. The mere act of typing on a touchscreen keyboard may allow capture of a fingerprint. Additionally or alternatively, the act of pressing on a button (physical or virtual) to save a document may allow for capture of a fingerprint. Notably, the document need not be limited to text. Indeed, the document may be created using a "paint" program or other graphics-oriented program, such as those program used for computer aided design (CAD). Indeed, the device may capture an audio recording of a voice or other audio, such as live music. Responsive to a press on a button (physical or virtual) to record, pause, or stop recording, a fingerprint may be captured.

Figures 4A, 4B:
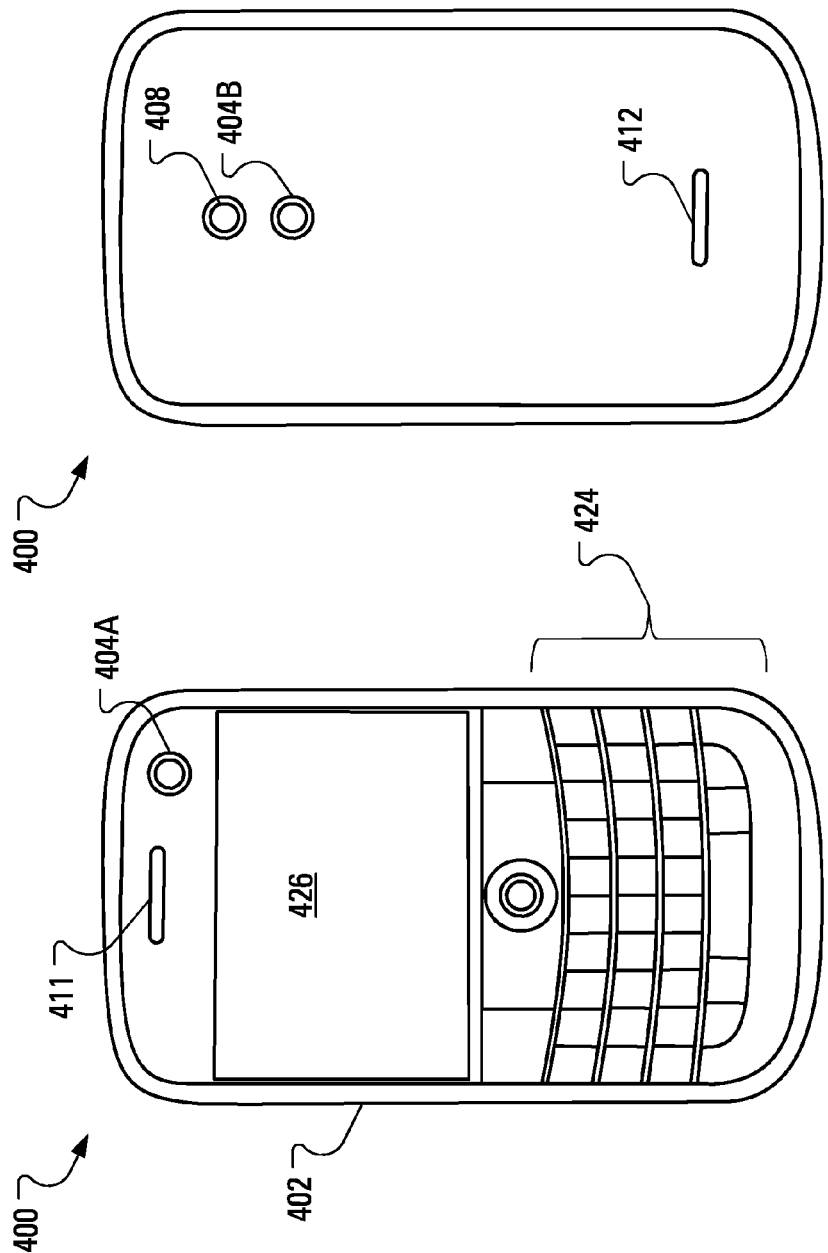
FIG. 4A illustrates a front view of a mobile communication device.
FIG. 4B illustrates a rear view of the mobile communication device of FIG. 4A.

FIG. 4A illustrates a front view of a mobile communication device 400, that may be considered to be a multifunction device given the numerous functions of which the mobile communication device 400 is capable. FIG. 4B illustrates a rear view of the mobile communication device 400. The mobile communication device 400 includes a housing 402, an input device (e.g., an optional keyboard 424 having a plurality of keys) and an output device (e.g., a display 426), which may comprise a full graphic, or full color, Liquid Crystal Display (LCD). In some embodiments, the display 426 may comprise a touchscreen display. In such embodiments, the keyboard 424 may comprise a virtual keyboard. In some embodiments, the keyboard 424 may comprise a hardware keyboard and a virtual keyboard. Other types of output devices may alternatively be utilized.

In FIG. 4A, further components of the mobile communication device 400 are visible, including a speaker 411 and a secondary (front-facing) lens 404A. In FIG. 4B, further components of the mobile communication device 400 are visible, including a primary (rear-facing) lens 404B, a flash 408 and a fingerprint sensor 412.

Figure 5:
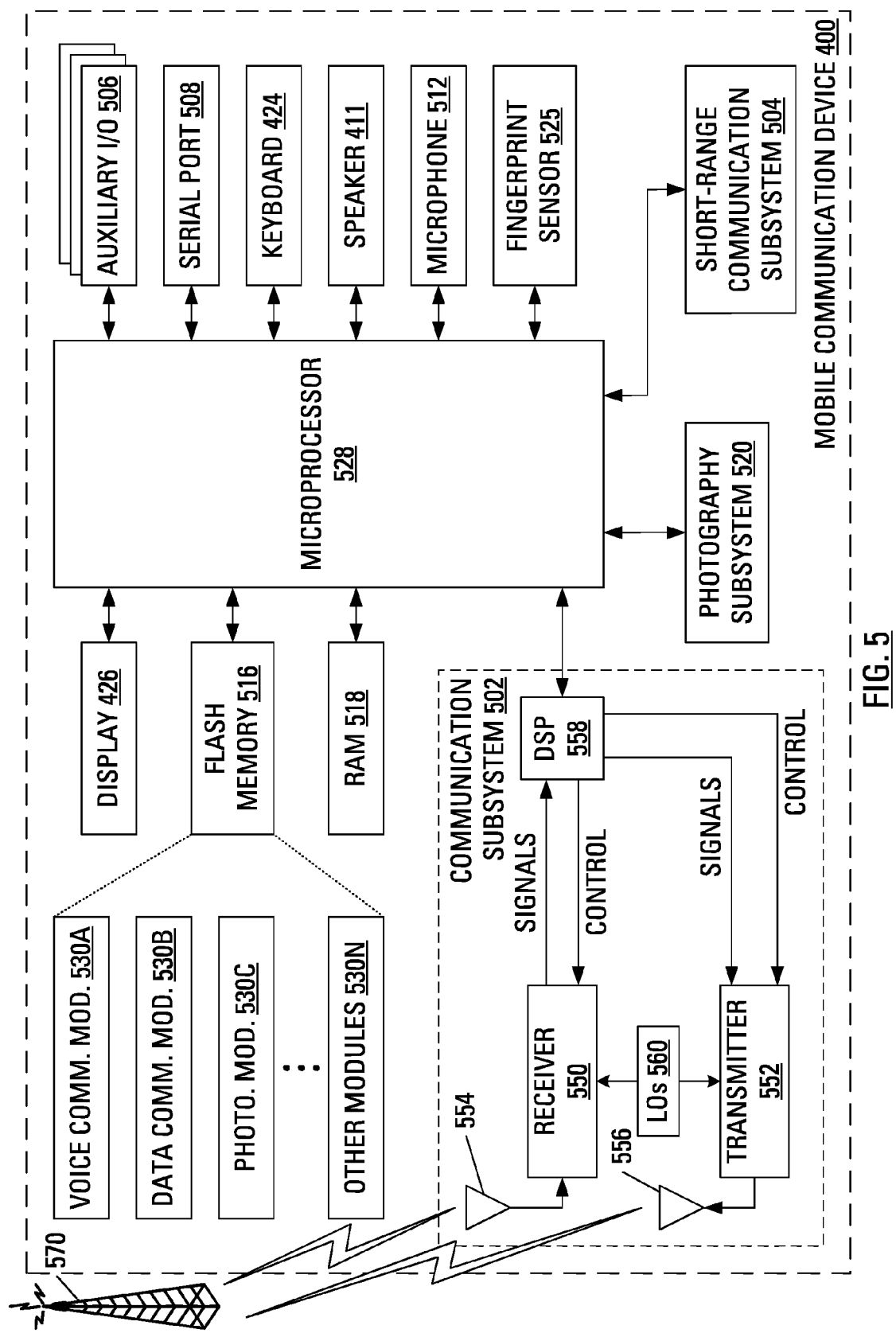
FIG. 5 illustrates an example block diagram of the mobile communication device of FIG. 4A.

FIG. 5 illustrates an example block diagram of the mobile communication device 400 of FIGS. 4A and 4B. A processing device (a microprocessor 528) is shown schematically in FIG. 5 as coupled between the keyboard 424 and the display 426.

The microprocessor 528 controls the operation of the display 426, as well as the overall operation of the mobile communication device 400, in part, responsive to actuation of the keys on the keyboard 424 by a user.

The housing may be elongated vertically, or may take on other sizes and shapes (including clamshell housing structures). Where the keyboard 424 includes keys that are associated with at least one alphabetic character and at least one numeric character, the keyboard 424 may include a mode selection key, or other hardware or software, for switching between alphabetic entry and numeric entry.

In addition to the microprocessor 528, other parts of the mobile communication device 400 are shown schematically in FIG. 5. These may include a communications subsystem 502, a short-range communications subsystem 504, the keyboard 424 and the display 426. The mobile communication device 400 may further include other input/output devices, such as a set of auxiliary I/O devices 506, a serial port 508, the speaker 411 and a microphone 512. The mobile communication device 400 may further include memory devices including a flash memory 516 and a Random Access Memory (RAM) 518 and a photography subsystem 520.

The photography subsystem 520 may include the primary lens 404B with corresponding primary shutter (not shown), the secondary lens 404A with corresponding secondary shutter (not shown) and at least one image sensor (not shown).

Various other subsystems and a power supply, such as a rechargeable battery, are not shown. The mobile communication device 400 may comprise a two-way radio frequency (RF) communication device having voice and data communication capabilities. In addition, the mobile communication device 400 may have the capability to communicate with other computer systems via the Internet.

Operating system software executed by the microprocessor 528 may be stored in a computer readable medium, such as the flash memory 516, but may be stored in other types of memory devices, such as a read only memory (ROM) or similar storage element. In addition, system software, specific device applications, or parts thereof, may be temporarily loaded into a volatile store, such as the RAM 518. Communication signals received by the mobile device may also be stored to the RAM 518.

The microprocessor 528, in addition to its operating system functions, enables execution of software applications on the mobile communication device 400. A predetermined set of software applications that control basic device operations, such as a voice communications module 530A and a data communications module 530B, may be installed on the mobile communication device 400 during manufacture. A photography module 530C may also be installed on the mobile communication device 400 during manufacture, to implement aspects of the present disclosure. As well, additional software modules, illustrated as an other software module 530N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 570 represented by a radio tower. The data items managed by the PIM application may be seamlessly integrated, synchronized and updated via the wireless carrier network 570 with the device user's corresponding data items stored or associated with a host computer system.

Communication functions, including data and voice communications, are performed through the communication subsystem 502 and, possibly, through the short-range communications subsystem 504. The communication subsystem 502 includes a receiver 550, a transmitter 552 and one or more antennas, illustrated as a receive antenna 554 and a transmit antenna 556. In addition, the communication subsystem 502 also includes a processing module, such as a digital signal processor (DSP) 558, and local oscillators (LOs) 560. The specific design and implementation of the communication subsystem 502 is dependent upon the communication network in which the mobile communication device 400 is intended to operate. For example, the communication subsystem 502 of the mobile communication device 400 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the mobile communication device 400.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 400 may send and receive communication signals over the wireless carrier network 570. Signals received from the wireless carrier network 570 by the receive antenna 554 are routed to the receiver 550, which provides for signal amplification, frequency down conversion, filtering, channel selection, etc., and may also provide analog to digital conversion. Analog-to-digital conversion of the received signal allows the DSP 558 to perform more complex communication functions, such as demodulation and decoding. In a similar manner, signals to be transmitted to the wireless carrier network 570 are processed (e.g., modulated and encoded) by the DSP 558 and are then provided to the transmitter 552 for digital to analog conversion, frequency up conversion, filtering, amplification and transmission to the wireless carrier network 570 (or networks) via the transmit antenna 556.

In addition to processing communication signals, the DSP 558 provides for control of the receiver 550 and the transmitter 552. For example, gains applied to communication signals in the receiver 550 and the transmitter 552 may be adaptively controlled through automatic gain control algorithms implemented in the DSP 558.

In a data communication mode, a received signal, such as a text message or web page download, is processed by the communication subsystem 502 and is input to the microprocessor 528. The received signal is then further processed by the microprocessor 528 for output to the display 426, or alternatively to some auxiliary I/O devices 506. A device user may also compose data items, such as e-mail messages, using the keyboard 424 and/or some other auxiliary I/O device 506, such as a touchpad, a rocker switch, a thumb-wheel, a trackball, a touchscreen, or some other type of input device. The composed data items may then be transmitted over the wireless carrier network 570 via the communication subsystem 502.

In a voice communication mode, overall operation of the device is substantially similar to the data communication mode, except that received signals are output to the speaker 411, and signals for transmission are generated by a microphone 512. Alternative voice or audio I/O subsystems, such as a voice message recording subsystem, may also be implemented on the mobile communication device 400. In addition, the display 426 may also be utilized in voice communication mode, for example, to display the identity of a calling party, the duration of a voice call, or other voice call related information.

The short-range communications subsystem 504 enables communication between the mobile communication device 400 and other proximate systems or devices, which need not necessarily be similar devices. For example, the short-range communications subsystem may include an infrared device and associated circuits and components, or a Bluetooth™ communication module to provide for communication with similarly-enabled systems and devices, or a NFC (near field communication) module, etc. The short-range communications subsystem 504 may include a Wi-Fi module implementing one or more of the Institute of Electrical and Electronics Engineers (IEEE) 802.11 family of standards.

The photographer of a digital photograph is considered to be the author of the digital photograph pursuant to principles of copyright law. If the photographer uploads a digital photograph to a web site, the digital photograph may be susceptible to being copied and re-posted by copyists, without permission and without proper attribution to the original photographer. The copyists may attempt to pass off the digital photograph as their own work or, at least, may fail to give credit to the original photographer. Sometimes the photographer may process the digital photograph to provide a copyright notice visible on the digital photograph. However, a determined copyist may further process (e.g., crop or otherwise alter) the digital photograph to remove the copyright notice before reposting, and taking credit for, the digital photograph.

Additionally, problems may be perceived when an anonymous person uploads a digital photograph to a web site, such as when the digital photograph shows secret information (such as a secret product prototype) that the anonymous person has no right to publicly reveal. In some instances, uploading of this type can constitute criminal activity. It is desirable to identify the anonymous person responsible for the upload.

In overview, it is proposed herein to store biometric information regarding the identity of an author in association with the work created by the author. To facilitate the association, an apparatus used to create the work may be configured to include a component for capturing the biometric information regarding the identity of the author.

In one example, the author may be a photographer and the work may comprise a digital photograph. The biometric information regarding the identity of the photographer may comprise a digital representation of a fingerprint of the photographer.

In the cases in which the apparatus that is configured with the ability to capture digital photographs is a multifunction device, such as the mobile communication device 400, it may be that the apparatus includes a fingerprint sensor for authentication purposes, such as fingerprint sensor 412. In such a case, a further fingerprint sensor would not be necessary as the fingerprint sensor 412 can also serve as the component for capturing the information regarding the identity of the author.

Notably, in cases wherein the apparatus includes an interactive touchscreen, the interactive touchscreen may be configured to detect images. Accordingly, the interactive touchscreen may serve as the component for capturing the information regarding the identity of the author.

Figure 6:
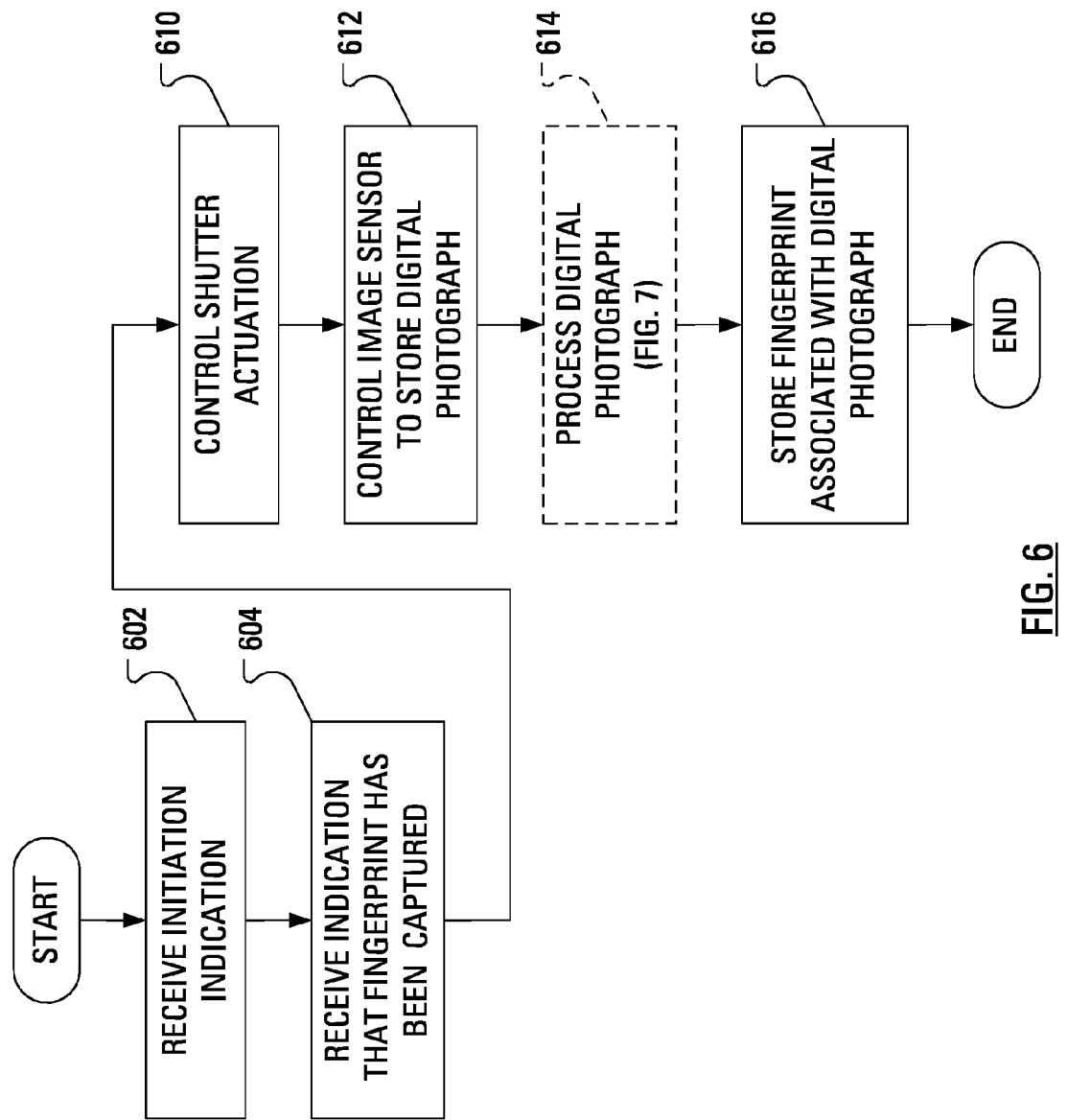
FIG. 6 illustrates example steps in a digital photograph capturing method.

Referring to FIG. 6, in operation, the microprocessor 206, 528 receives (step 602) an indication that the photographer is preparing to capture a digital photograph. In the case in which the apparatus is the dedicated digital camera 100, such an indication may be received merely as a powering on of the digital camera 100. In the case in which the apparatus is a multifunction device, such as the mobile communication device 400, such an indication may be received as the photographer manipulates a user interface to select and initiate execution of the photography module 530C (which may comprise a camera application).

The photographer may apply a finger to the fingerprint sensor 112, 412. The fingerprint sensor 112, 412 may then capture a digital fingerprint and indicate to the microprocessor 206, 528 that the digital fingerprint has been captured. Additional fingerprints from other fingers may optionally be captured.

In alternative embodiments, an icon may be presented on an interactive touchscreen with an instruction to prompt the photographer to touch the icon to initiate image capture. Responsive to the photographer's touch on the icon, a fingerprint sensor built into the interactive touchscreen may capture a digital fingerprint and indicate to the microprocessor 206, 528 that the digital fingerprint has been captured.

Upon determining (step 606) that an indication that the digital fingerprint has been captured has been received, the microprocessor 206, 528 may allow the photographer to use the apparatus 100, 400 to capture a digital photograph.

It has been discussed hereinbefore that the shutter button 110 of the digital camera 100 of FIG. 1 generates a shutter actuation instruction responsive to having been pressed. In the context of the mobile communication device 400, the photography module 530C, while executing, may interpret a press on a particular key of the keyboard 424 as an indication of a wish to capture a digital photograph. Responsively, the photography module 530C may generate a shutter actuation instruction and transmit the shutter actuation instruction to the microprocessor 528.

Upon receiving (step 608) a shutter actuation instruction, the microprocessor 206, 528 may control (step 610) a shutter (e.g., the shutter 202 of FIG. 2 or one or more of the shutters in the photography subsystem 520 of FIG. 5) to open for the duration of an exposure time and then shut. During the exposure time, when the shutter is open, light is allowed to pass through the corresponding lens and onto the image sensor. The microprocessor 206, 528 may then control (step 612) the image sensor to store its output (a digital photograph) to a computer readable medium, such as the memory 210 of FIG. 2 or the RAM 518 of FIG. 5.

Optionally, the microprocessor 206, 528 may process (step 614) the digital photograph.

It is proposed herein that the microprocessor 528 store (step 616) the digital fingerprint associated with the digital photograph. In keeping with present methods for associating additional information with digital documents, the microprocessor 528 may store the digital fingerprint in a metadata container. The microprocessor 528 may additionally or alternatively process the digital photograph to include the digital fingerprint in a digital watermark.

Optionally, the microprocessor 206, 528 may save the digital fingerprint associated with the digital photograph in a manner that is difficult to detect. Indeed, the photographer may not realize that the digital fingerprint is being saved as metadata associated with the digital photograph or in a digital watermark.

Further optionally, in another embodiment, the microprocessor 206, 528 may store (step 616) the digital fingerprint in a manner that is visible in the digital photograph.

Figure 7:
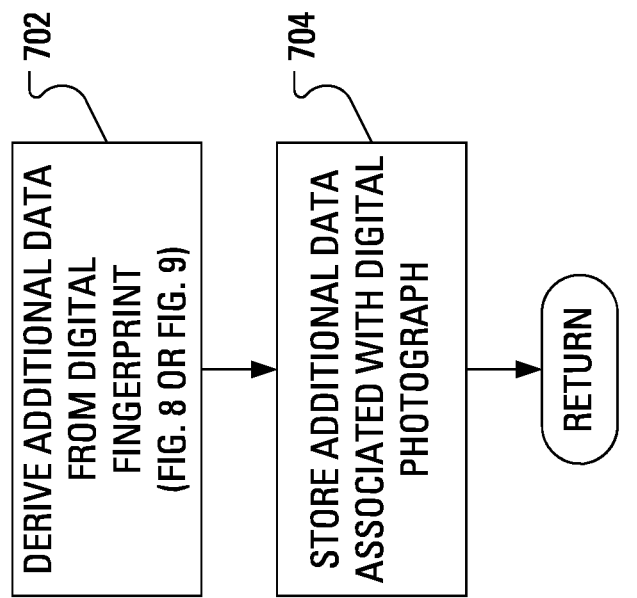
FIG. 7 illustrates example steps in an optional digital photograph processing method as an expansion of a step in the method of FIG. 6.

FIG. 7 illustrates example steps in an optional digital photograph processing method. The microprocessor 206, 528 may, for example, derive (step 702) additional data based on the digital fingerprint and then store (step 704) the additional data as metadata associated with the digital photograph.

Deriving (step 702) the additional data may, for example, comprise comparing the digital fingerprint to one or more digital fingerprint templates. A digital fingerprint template of the owner of the apparatus may have been captured during configuration of the apparatus. The digital fingerprint template of the owner may be stored in the memory (210, 516, 518) on the apparatus. Multiple digital fingerprint templates may be stored on a server. The multiple digital fingerprint templates may, for example, relate to a particular population with some aspect in common, such as a population of employees of a given organization or a population comprised of known criminals.

Figure 8:
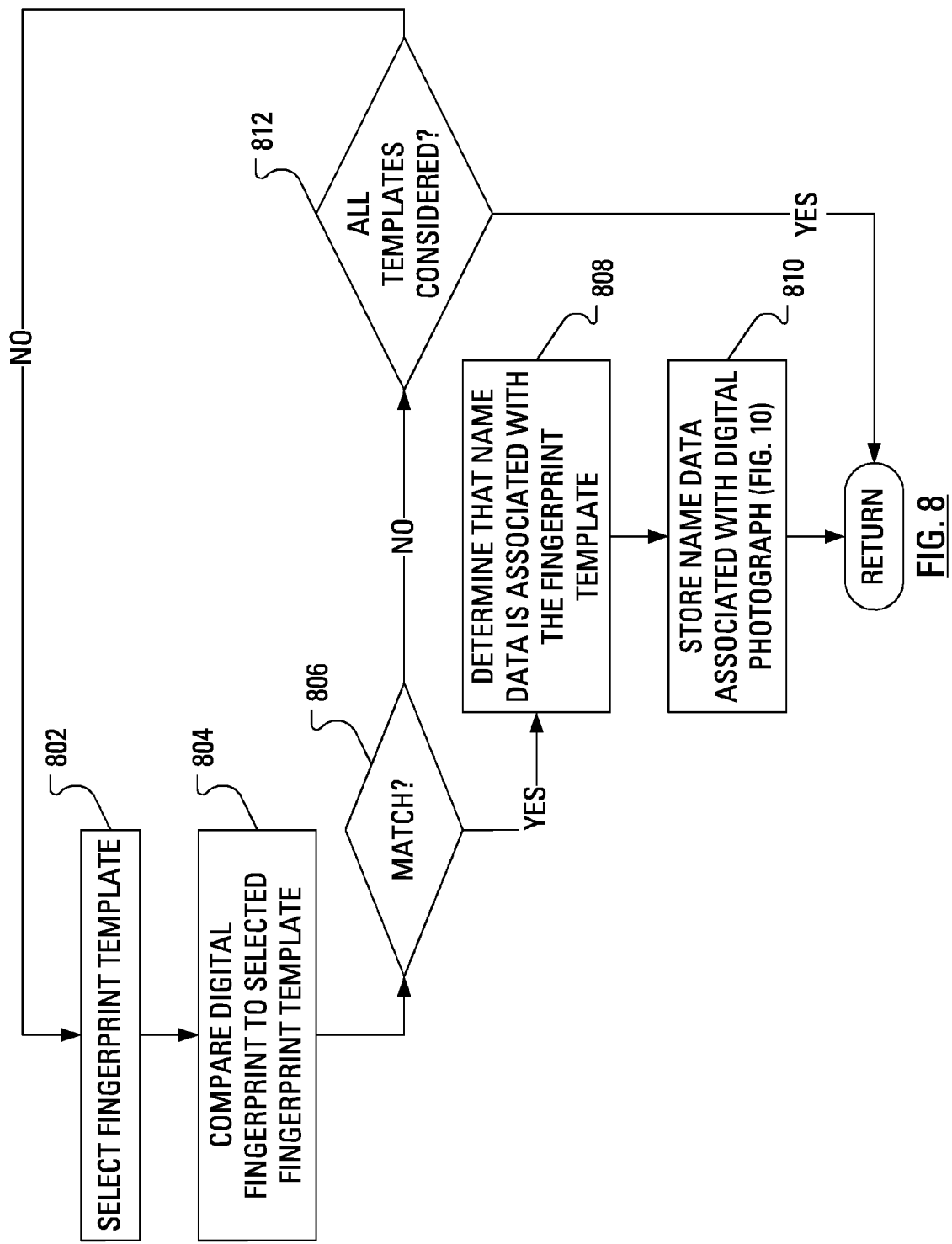
FIG. 8 illustrates example steps in an optional additional data derivation method as an expansion of a step in the method of FIG. 7.

FIG. 8 illustrates example steps in an optional additional data derivation method. Additional data derivation (step 702, FIG. 7) may involve the microprocessor 206, 528 selecting (step 802) a digital fingerprint template from among a plurality of previously stored digital fingerprint templates. The microprocessor 206, 528 may then compare (step 804) the digital fingerprint to the selected digital fingerprint template. Upon determining (step 806) that the digital fingerprint is a match for the selected digital fingerprint template, the microprocessor 206, 528 may determine (step 808) that name data is associated with the digital fingerprint template. Responsively, the microprocessor 206, 528 may store (step 810) the name data as metadata associated with the digital photograph.

Upon determining (step 806) that the digital fingerprint is not a match for the selected digital fingerprint template, the microprocessor 206, 528 may determine (step 812) whether all digital fingerprint templates in the plurality of previously stored digital fingerprint templates have been considered.

Upon determining (step 812) that not all digital fingerprint templates in the plurality of previously stored digital fingerprint templates have been considered, the microprocessor 206, 528 may select (step 802) a further digital fingerprint template from among a plurality of previously stored digital fingerprint templates.

Upon determining (step 812) that all digital fingerprint templates in the plurality of previously stored digital fingerprint templates have been considered, the microprocessor 206, 528 may return control to the digital photograph processing method of FIG. 7.

Figure 9:
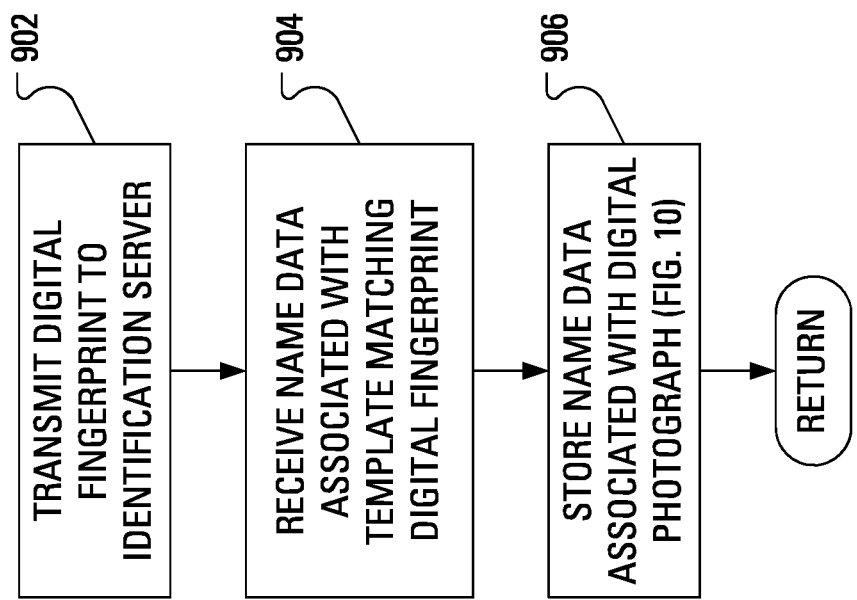
FIG. 9 illustrates example steps in an optional additional data derivation method as an expansion of a step in the method of FIG. 7.

FIG. 9 illustrates example steps in an optional additional data derivation method. Additional data derivation (step 702, FIG. 7) may involve the microprocessor 206, 528 transmitting (step 902) the digital fingerprint to an identity server (not shown). It is expected that the identity server will carry out a method similar to the method of FIG. 8 and return name data associated with the digital fingerprint template. Upon receiving (step 904) the name data, the microprocessor 206, 528 may store (step 906) the name data as metadata associated with the digital photograph.

Optionally, the microprocessor 206, 528 may transmit the digital fingerprint to the identity server without regard to expecting a return of name data. The microprocessor 206, 528 may also transmit the digital photograph to the identity server. Accordingly, the digital photograph and digital fingerprint are registered with the server for future reference. Further, the microprocessor 206, 528 may transmit the digital fingerprint and the digital photograph to a photo sharing site such as Flickr, Shutterfly, Panoramio, Photobucket, Picasa, Snapfish or Facebook, etc.

Figure 10:
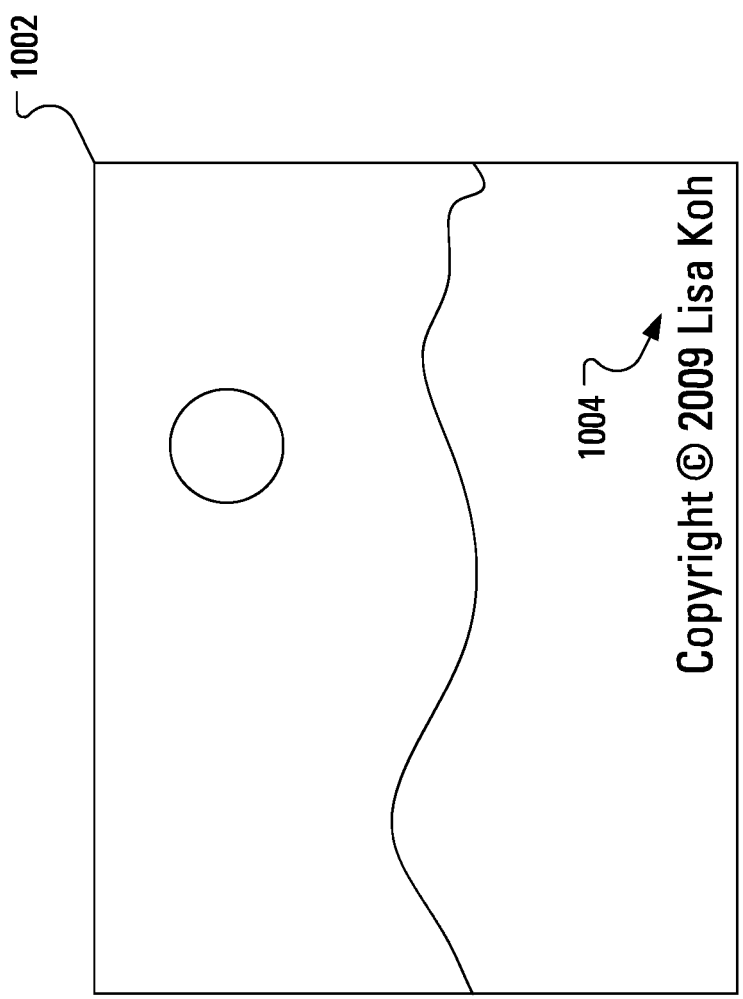
FIG. 10 illustrates an example digital photograph resulting from an optional name data storage method as an expansion of a step in the method of FIG. 9.

FIG. 10 illustrates a result of an optional name data storage method. Name data storage (step 810, FIG. 8, step 906, FIG. 9) may involve the microprocessor 206, 528 processing a digital photograph 1002 in a manner that includes the name data in the digital photograph 1002 as visible data 1004. For example, the microprocessor 206, 528 may process the digital photograph in a manner that includes the name data as a visible watermark, such as a copyright notice, e.g., "Copyright © 2009 [Person's Name]".

FIG. 11 illustrates a result of an optional name data storage method. Name data storage (step 810, FIG. 8, step 906, FIG. 9) may involve the microprocessor 206, 528 processing a digital photograph 1102 in a manner that includes an indication that name data has been stored in association with the digital photograph 1102. For example, the microprocessor 206, 528 may process the digital photograph in a manner that includes the indication as a visible watermark, such as a visible icon 1104.

Note that the person taking the photo may not always be the owner of the apparatus (digital camera 100 of FIG. 1 or the mobile communication device 400 of FIG. 4). For example, the owner of the apparatus might hand the apparatus to another person and ask the other person to manipulate the apparatus to capture a digital photograph; or the owner of the apparatus may let a friend or family member borrow the apparatus; or the owner of the apparatus may ask a stranger to take a photo of the owner; or the apparatus may be lost or stolen, etc.

Indeed, if the apparatus is lost or stolen, the aspects of only allowing a digital photograph to be captured responsive to determining (step 606, FIG. 6) that a digital fingerprint has been captured and automatically transmitting (step 902, FIG. 9) the digital fingerprint (with or without the digital photograph) to an identity server may facilitate identification of a thief and recovery of the lost or stolen apparatus.

In accordance with another embodiment, the secondary lens 404A is used to capture biometric data. Upon receiving a shutter actuation instruction, the microprocessor 528 may control two shutters (i.e., the shutters in the photography subsystem 520 of FIG. 5 associated with the primary lens 404B and the secondary lens 404A) to open for the duration of an exposure time and then shut. The microprocessor 528 may then control the image sensor associated with the primary lens 404B to store its output (a "primary" digital photograph) to the RAM 518 of FIG. 5. The microprocessor 528 may also control the image sensor associated with the secondary lens 404A to store its output (a "secondary" digital photograph) to the RAM 518 of FIG. 5 associated with the digital photograph from the image sensor associated with the primary lens 404B.

Since the photographer is typically looking at the front (shown in FIG. 4A) of the mobile communication device 400 when taking a picture, the secondary digital photograph is likely to comprise an image of the photographer's face. The microprocessor 528 may embed the secondary digital photograph into the primary digital photograph. Alternatively, there may be other ways to associate the secondary digital photograph with the primary digital photograph.

In the manner described hereinbefore, the secondary digital photograph may be treated as the digital biometric to derive additional information about the photographer. For instance, the secondary digital photograph may be compared to "template" digital photographs using face recognition techniques either locally at the mobile communication device 400 or remotely at an identity server. The present embodiment may comprise another aid to the recovery of a lost or stolen apparatus and may facilitate the identification of a possible thief, by capturing an image of the face of the unauthorized user of the device.

In each of the above-described embodiments, the association of a biometric indication of an identity of an author may be applicable to other works. For example, artistic work may comprise video. The microprocessor may only allow video recording to start responsive to receiving a digital fingerprint from the videographer. The videographer may also provide a fingerprint to stop the recording. While it is expected that the same finger will be used to actuate starting and stopping, the apparatus may be configured to start and stop responsive to different fingers from the same person or different people's fingers are used in the same video, digital versions of all of the various fingerprint images can be stored associated with the digital video.

While the fingerprint sensors 112, 412 have been illustrated as integral to the main apparatus 100, 400 capturing the artistic work, it is contemplated that a fingerprint sensor may be a component of a peripheral device, connected to the main apparatus 100, 400 in a wired or wireless manner. In the latter case, the mobile communication device 400 may connect to the peripheral device using the short-range communications subsystem 504, for example using a communications protocol according to Bluetooth™, NFC, or other communications standard.

While a fingerprint has been used as an example element of biometric data, other elements of biometric data may equally be used. Biometric information may include, for example, fingerprints, retinal scans, iris recognition, face geometry scans, hand geometry scans, voice or speech prints, etc.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of storing an artistic work of authorship at an apparatus configured to capture the artistic work of authorship, the method comprising:
   at a sensor:
      detecting a fingerprint on the sensor to initiate capture of the work;
      constructing, based on the detecting, a biometric indication of an identity of an author of the work; and
      generating, responsive to the constructing the biometric indication, a capture instruction; and
   at a processing device:
      responsive to receiving the capture instruction, arranging capture of the artistic work;
      storing the artistic work at the apparatus; and
      storing, associated with the artistic work, the biometric indication of the identity of the author.

2. The method of claim 1 wherein the storing the biometric indication of the identity of the author comprises storing the biometric indication in metadata.

3. The method of claim 1 wherein the storing the biometric indication of the identity of the author comprises processing the artistic work to include the biometric indication of the identity of the author in a digital watermark.

4. The method of claim 1 wherein the storing the biometric indication of the identity of the author comprises storing the biometric indication in a manner that is visible in the artistic work.

5. The method of claim 1 wherein the receiving the instruction to capture the artistic work comprises receiving a shutter actuation instruction.

6. The method of claim 1 wherein the receiving the instruction to capture the artistic work comprises receiving a begin recording instruction.

7. The method of claim 1 wherein the artistic work comprises a digital video.

8. The method of claim 1 wherein the artistic work comprises a digital photograph.

9. The method of claim 1 wherein the artistic work comprises text.

10. The method of claim 1 wherein the artistic work comprises graphics.

11. The method of claim 1 wherein the biometric indication of the identity of the author comprises a digital fingerprint.

12. The method of claim 11 further comprising:
   comparing the digital fingerprint to a digital fingerprint template;
   responsive to the comparing, determining that the digital fingerprint matches the digital fingerprint template; and
   determining name data associated with the digital fingerprint template.

13. The method of claim 12 further comprising storing, associated with the artistic work, the name data.

14. The method of claim 12 further comprising processing the artistic work to include the name data in a digital watermark.

15. The method of claim 11 further comprising transmitting the digital fingerprint to an identity server.

16. The method of claim 15 further comprising:
   receiving, from the identity server, name data; and
   storing, associated with the artistic work, the name data.

17. The method of claim 1 wherein the biometric indication of the identity of the author comprises a digital photograph of the author.

18. An apparatus configured to capture an artistic work of authorship, the apparatus comprising:
   a sensor adapted to:
      detect a fingerprint on the sensor to initiate capture of the work;
      construct, based on the detecting, a biometric indication of an identity of an author of the work; and
      generate, responsive to constructing the biometric indication, a capture instruction; and
   a memory;
   a processing device adapted to:
      receive the capture instruction;
      responsive to receiving the capture instruction, arrange capture of the artistic work;
      store the artistic work in the memory; and
      store in the memory, associated with the artistic work, the biometric indication of the identity of the author.

19. The apparatus of claim 18 wherein the processor is further adapted to store the biometric indication in metadata.

20. The apparatus of claim 18 wherein the processor is further adapted to process the artistic work to include the biometric indication of the identity of the author in a digital watermark.

21. The apparatus of claim 18 wherein the processor is further adapted to store the biometric indication in a manner that is visible in the artistic work.

22. A non-transitory computer readable storage medium containing computer-executable instructions that, when performed by a processing device, cause the processing device to:

receive a capture instruction, the capture instruction generated, by a sensor, responsive to the sensor:

detecting a fingerprint on the sensor to initiate capture of the work; and constructing, based on the detecting, a biometric indication of an identity of an author of an artistic work of authorship;

responsive to receiving the capture instruction, arrange capture of the artistic work;

store the artistic work in the memory; and store in the memory, associated with the artistic work, the biometric indication of the identity of the author.

23. The non-transitory computer readable storage medium of claim 22 wherein the instructions further cause the processing device to store the biometric indication in metadata.

24. The non-transitory computer readable storage medium of claim 22 wherein the instructions further cause the processing device to process the artistic work to include the biometric indication of the identity of the author in a digital watermark.

25. The non-transitory computer readable storage medium of claim 22, the instructions further cause the processing device to store the biometric indication in a manner that is visible in the artistic work.

* * * * *